(12) United States Patent
Luo et al.

(10) Patent No.: US 12,530,562 B2
(45) Date of Patent: Jan. 20, 2026

(54) CHIPLET-BASED HIERARCHICAL TREE TOPOLOGY ARCHITECTURE FOR NEUROMORPHIC COMPUTING

(71) Applicant: Alibaba (China) Co., Ltd., Hangzhou (CN)

(72) Inventors: Junwen Luo, Shanghai (CN);
Shengcheng Wang, Shanghai (CN);
Jiansong Zhang, Hangzhou (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 714 days.

(21) Appl. No.: 17/982,995

(22) Filed: Nov. 8, 2022

(65) Prior Publication Data
US 2024/0013025 A1 Jan. 11, 2024

(30) Foreign Application Priority Data
Jul. 11, 2022 (CN) .......................... 202210811998.8

(51) Int. Cl.
G06N 3/04 (2023.01)
G06N 3/063 (2023.01)

(52) U.S. Cl.
CPC .............. *G06N 3/04* (2013.01); *G06N 3/063* (2013.01)

(58) Field of Classification Search
None
See application file for complete search history.

(56) References Cited

U.S. PATENT DOCUMENTS

| | | |
|---|---|---|
| 5,583,964 A | 12/1996 | Wang |
| 8,812,414 B2 | 8/2014 | Arthur et al. |
| 8,909,576 B2 | 12/2014 | Akopyan et al. |
| 9,256,215 B2 | 2/2016 | Sinyavskiy et al. |
| 9,256,823 B2 | 2/2016 | Sinyavskiy et al. |
| 9,934,463 B2 | 4/2018 | Seo et al. |
| 10,242,737 B1 | 3/2019 | Lin et al. |
| 10,248,907 B2 | 4/2019 | Gokmen et al. |
| 10,423,877 B2 | 9/2019 | Cox et al. |
| 10,565,500 B2 | 2/2020 | Lin |
| 10,635,398 B2 | 4/2020 | Lin et al. |

(Continued)

OTHER PUBLICATIONS

Merolla, P. et al., A Multicast Tree Router for Multichip Neuromorphic Systems, 2014, IEEE, pp. 820-833. (Year: 2014).*

(Continued)

*Primary Examiner* — Eric Coleman
(74) *Attorney, Agent, or Firm* — Sheppard Mullin Richter & Hampton LLP

(57) ABSTRACT

This application describes chiplet-based neuromorphic systems, devices, and chips. An exemplary chiplet-based neuromorphic system may include: a plurality of neuron processing entities (NPE); a plurality of chiplets each comprising a plurality of switches and a group of NPEs from the plurality of NPEs; and a plurality of interposers each comprising a plurality of routers and a group of chiplets from the plurality of chiplets; wherein each of the plurality of switches within each chiplet connects to one or more of the group of NPEs, and the plurality of switches within the each chiplet are organized in a tree topology; wherein each of the plurality of routers within each interposers connects to one or more of the group of chiplets, and the plurality of routers within the each interposer are organized in a tree topology.

20 Claims, 6 Drawing Sheets

(56) References Cited

U.S. PATENT DOCUMENTS

| | | |
|---|---|---|
| 10,635,967 B2 | 4/2020 | Aparicio, IV |
| 10,817,778 B2 | 10/2020 | Baughman et al. |
| 10,846,590 B2 | 11/2020 | Imam et al. |
| 10,909,449 B2 | 2/2021 | Obradovic et al. |
| 10,956,815 B2 | 3/2021 | Gokmen |
| 11,062,203 B2 | 7/2021 | Chen et al. |
| 11,847,049 B2 * | 12/2023 | Wang .................. G06F 13/4068 |
| 2011/0106742 A1 | 5/2011 | Pino |
| 2011/0238963 A1 * | 9/2011 | Kim ...................... G06F 9/3889 |
| | | 712/E9.035 |
| 2017/0116154 A1 * | 4/2017 | Palmer ................ G06F 9/30098 |
| 2018/0075338 A1 | 3/2018 | Gokmen |
| 2018/0100965 A1 * | 4/2018 | Huangfu .................. G02B 6/43 |
| 2019/0244662 A1 | 8/2019 | Lee et al. |
| 2019/0245543 A1 * | 8/2019 | Lee ....................... G11C 11/419 |
| 2019/0349318 A1 * | 11/2019 | Fok .......................... G06N 3/08 |
| 2021/0019609 A1 | 1/2021 | Strukov et al. |
| 2022/0129743 A1 * | 4/2022 | Sawada .................. G06N 3/048 |
| 2023/0168921 A1 * | 6/2023 | Kim ........................ G06F 15/80 |
| | | 712/220 |

OTHER PUBLICATIONS

Yin, J et al., Modular Routing Design for Chiplet-based Systems, 2018, IEEE, pp. 726-738. (Year: 2018).*

* cited by examiner

US 12,530,562 B2

CHIPLET-BASED HIERARCHICAL TREE TOPOLOGY ARCHITECTURE FOR NEUROMORPHIC COMPUTING

CROSS-REFERENCE TO RELATED APPLICATION

This application claims priority to and benefits of Chinese patent Application No. 202210811998.8, filed with the China National Intellectual Property Administration (CNIPA) on Jul. 11, 2022. The entire contents of the above-identified application are incorporated herein by reference.

TECHNICAL FIELD

The disclosure relates generally to a neuromorphic device and system with ultra-high data transmission bandwidth, flexibility, and scalability for Artificial Intelligence (AI) applications.

BACKGROUND

Neuromorphic chips or systems hold potentials to be the next generation AI architecture due to its power-efficient computing and cognitive computing. However, existing architectures for neuromorphic chips and systems are facing challenges for scaling out. From a performance perspective, typical neuromorphic chips or systems are Bus, Crossbar, Network on Chip, or Mesh based architectures, which suffer from limited data transmission bandwidth and poor scalability. From a hardware perspective, existing neuromorphic chips or systems rely on monolithic processors (e.g., CPUs, GPUs) to provide computing resources. Even though monolithic processors have higher density thus potentially better performance (as the processing units are closer to each other), the cost of manufacturing monolithic processors grows with the increasing size of dies (e.g., a larger die will result in a lower production yield rate). Furthermore, it may become increasingly impractical to build monolithic chips for the next generation AI models and applications that require an enormous number of processing units. To address the above challenges, a new chiplet-based hierarchical tree topology architecture is described in this disclosure.

SUMMARY

Various embodiments of the present specification may include hardware circuits, systems, devices with a chiplet-based hierarchical tree topology architecture. This architecture may be applied at both macro level (e.g., data center level) and micro level (chip level).

According to one aspect, a chiplet-based neuromorphic system is described. The system may include a plurality of neuron processing entities (NPEs); a plurality of chiplets each comprising a plurality of switches and a group of NPEs from the plurality of NPEs; and a plurality of interposers each comprising a plurality of routers and a group of chiplets from the plurality of chiplets. In some embodiments, each of the plurality of switches within each chiplet connects to one or more of the group of NPEs within the each chiplet, and the plurality of switches within the each chiplet are organized in a tree topology. In some embodiments, each of the plurality of routers within each interposer connects to one or more of the group of chiplets within the each interposer, and the plurality of routers within the each interposer are organized in a tree topology.

In some embodiments, each of the plurality of NPEs comprises register files as a local memory.

In some embodiments, the group of chiplets within each interposer are connected with one or more micro-bumps.

In some embodiments, the system further includes a plurality of rack-level switches each connecting to a group of interposers from the plurality of interposers, wherein the plurality of rack-level switches are organized in a tree topology.

In some embodiments, each of the plurality of chiplets comprises a configurable chiplet-level clock to coordinate the group of NPEs within the each chiplet.

In some embodiments, the chiplet-level clock of one chiplet is independent from the chiplet-level clock of another chiplet.

In some embodiments, each of the plurality of interposers comprises a configurable interposer-level clock to coordinate the group of chiplets within the each interposer, wherein the interposer-level clock is independent from the chiplet-level clock.

In some embodiments, the plurality of switches within each chiplet that are organized in the tree topology comprise: a root-level switch at a root level, wherein the root level is a highest level in the tree topology; multiple leaf-level switches at a leaf level, wherein the leaf level is a lowest level in the tree topology; and a plurality of intermediate-level switches between the root-level and the leaf-level, wherein each of the plurality of intermediate-level switches is connected to two or more lower-level switches and one higher-level switch.

In some embodiments, one of the plurality of intermediate-level switches comprises: a first input interface configured to receive one or more first requests from the higher-level switch; a first priority queue configured to store the received one or more first requests; a second input interface configured to receive one or more second requests from one of the two or more lower-level switches; a second priority queue configured to store the received one or more second requests; and a third input interface configured to receive one or more global commands that control a forwarding sequence of the one or more first requests stored in the first priority queue and one or more second requests stored in the second priority queue.

In some embodiments, the one or more first requests received from the higher-level switch comprise data received from the one or more of the group of NPEs connected to the higher-level switch.

In some embodiments, the group of NPEs within the each chiplet are connected with a local bus for local data communication.

According to another aspect, a chiplet-based tree-topology neuromorphic chip is described. The chiplet-based tree-topology neuromorphic chip includes a plurality of neuron processing entities (NPEs); a plurality of chiplets each comprising a plurality of switches and a group of NPEs from the plurality of NPEs, wherein each of the plurality of switches within each chiplet connects to one or more of the group of NPEs within the each chiplet, the plurality of switches within the each chiplet are organized in a tree topology, and the plurality of chiplets are packaged into an interposer using one or more micro-bumps.

According to yet another aspect, a tree-topology-based chiplet device is described. The tree-topology-based chiplet may include a plurality of neuron processing entities (NPEs); a plurality of switches each connecting to one or more of the plurality of NPEs; wherein the plurality of switches are organized in a tree topology that comprises: a root-level switch at a root level, wherein the root level is a highest level in the tree topology; multiple leaf-level switches at a leaf level, wherein the leaf level is a lowest level in the tree topology; and a plurality of intermediate-level switches between the root-level and the leaf-level, wherein each of the plurality of intermediate-level switches is connected to two or more lower-level switches and one higher-level switch.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

Figure 1A:
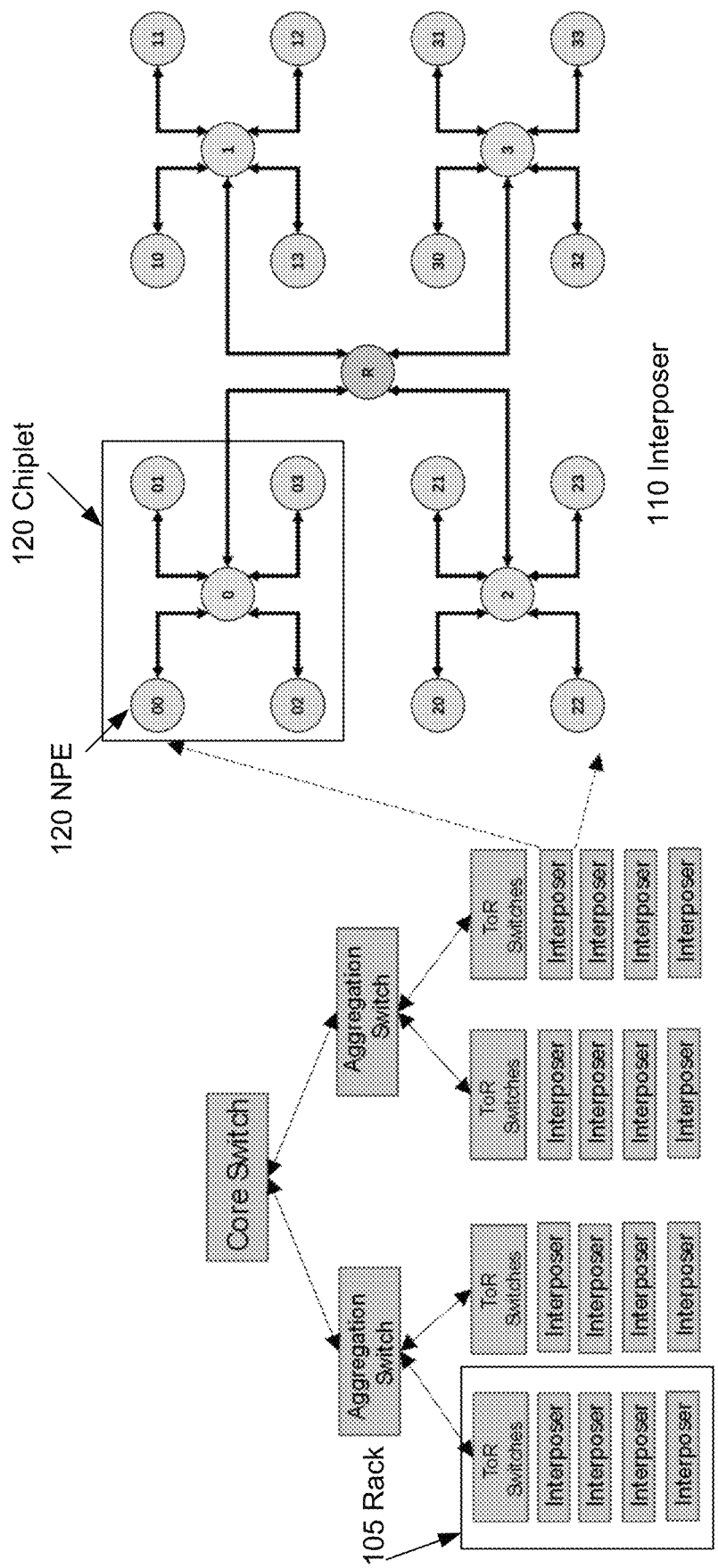
FIG. 1A illustrates an exemplary schematic diagram of a chiplet-based hierarchical tree topology architecture in accordance with some embodiments.

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Neuromorphic chips use electronic analog circuits to mimic neuro-biological architectures present in the nervous system of human brains, and have the potentials to be the next generation Artificial Intelligence (AI) architecture.

In some embodiments, these neuromorphic chips may be designed for spiking neural networks (SNN), which replicate the structure of the human brain. In addition to neuronal and synaptic state, SNNs incorporate the concept of time into their operations. The idea is that neurons in an SNN do not transmit information at each propagation cycle, as it happens with typical multi-layer perceptron networks such as convolutional neural networks (CNNs) or deep neural networks (DNNs). The neurons in the SNN transmit information when a membrane potential—an intrinsic quality of the neuron related to its membrane electrical charge— reaches a specific value, called the threshold. When the membrane potential reaches the threshold, the neuron fires, and generates a signal that travels to other neurons which, in turn, increase or decrease their potentials in response to this signal. In other words, SNNs can have a distinct data flow pattern from conventional neural networks. For instance, the training process of traditional CNNs or DNNs may perform forward-propagation and backward-propagation of the data, both involving migrating a large amount of data throughout the network layers, i.e., all data are moving across the layers. In contrast, the data migration within SNNs are tend to be localized, in which the closely located neurons within a region have a higher chance of data exchange while the distant neurons have a lower chance of data exchange. As such, the performance of SNNs are more bounded to the bandwidth among closely located neurons.

In addition, SNNs are generally at an ultra-large scale (e.g., 80 billions of neurons) in comparison to existing CNNs or DNNs. The existing chip and system designs for CNNs and DNNs relying on monolithic processors connected via Bus, Cross-bar, Network-on-Chip (NoC), and Mesh architectures may be incapable of being scaled out to the level of SNNs because of the decreasing production yield (e.g., a single wafer to fabricate such a large-scale monolithic chip results to very low yield rates), high latency (e.g., using a large amount multiple chips with NoC architecture results to considerable latency of chip-to-chip communications, and NoC architecture also suffers high latency of long-distance synaptic package transmission), and increasing complexity (e.g., the number of connections and routing complexity grows exponentially with increasing number of nodes in Mesh architectures).

With the above challenges introduced by SNNs and shortcomings of the existing neuromorphic designs, a more desired chip and system architecture may focus on both optimizing short-distance data communications and scalability. In some embodiments, the short-distance data communications may be optimized by implementing a hierarchical architecture with different levels of network bandwidth, and more closely-located neurons are connected with higher network bandwidth. The chip and system scalability may be improved by manufacturing smaller chiplets and packing chiplets to achieve similar performance as monolithic processors and a higher production yield rate. The following description introduces a chiplet-based hierarchical tree topology architecture by taking into account of these design considerations.

FIG. 1A illustrates an exemplary schematic diagram of a chiplet-based hierarchical tree topology architecture in accordance with some embodiments. The diagram illustrated in FIG. 1A covers both a macro-level architecture, i.e., the overall architecture 100, and a micro-level architecture, i.e., the interposer 110. In some embodiments, the overall architecture 100 refers to a data center environment that includes racks 105 of computing nodes. These computing nodes may be organized in a tree topology through different levels of switches, such as a core switch at level one, multiple aggregation switches at level two, and multiple top-of-rack (ToR) switches at rack level. In this tree topology, the core switch acts as the tree root and connects to the multiple aggregation switches, and each aggregation switches connects to multiple ToR switches. The computing nodes within one rack 105 may exchange data with computing nodes in the same rack 105 or from other racks 105 via the "tree" of switches (e.g., in-rack data exchange may go through its corresponding ToR switch, cross-rack data exchange may between two neighboring racks may go through a source ToR switch, an aggregation switch, and then a target ToR switch to find the target computing node).

In some embodiments, each of the computing nodes may include a plurality of interposers 110, each interposer 110 may include a plurality of chiplets 120, and each chiplet 120 may include a plurality of neuron processing entities (NPE) 120. In some embodiments, each of the chiplets 120 may include a plurality of switches that organize the NPEs therein in a tree topology. As an illustration, the chiplet 120 in FIG. 1A includes a single-level tree structure with a switch (circle labeled with 0) connected to four NPEs (circle labeled with 00, 01, 02, and 03). In some embodiments, each of the interposers 110 may include a plurality of routers that organize the chiplets therein in a tree topology. As an illustration, the interposer 110 in FIG. 1A includes a single-level tree structure with a router (circle labeled with R) connected to four chiplets 120.

With this design, the racks 105 are organized in a tree topology using the different levels of switches at the macro level (e.g., rack-level in a data center), and each computing node within each rack 105 also has an internal tree topology at the micro level (e.g., chip level) using interposers 110, chiplets 120, and NPEs 120.

In some embodiments, chiplets 120 are packaged in interposers 110 to replace monolithic processors. A chiplet 120 is an integrated circuit block configured to work with other similar chiplets to form larger, more complex chips. In comparison with monolithic chips requiring large dies (e.g., 1 million neurons on one die), smaller chiplets (e.g., 5000 neurons on one die) offer benefits such as higher yielding rate with a cost of performance. In order to compensate the performance degradation using the smaller chiplets, in some embodiments, the chiplets 120 are packaged into interposers 110 to achieve similar performance with monolithic processors while maintaining the high yielding rate. The interposer 110 may package a tree of chiplets 120 into a single silicon using multi-level switches.

Figure 1B:
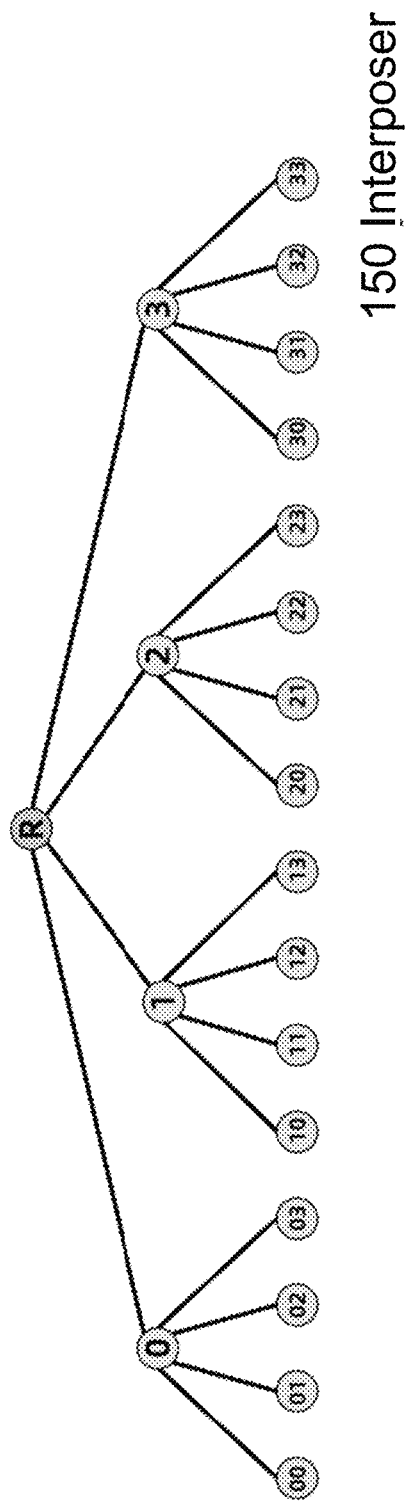
FIG. 1B illustrates an exemplary logic view of an interposer within the chiplet-based hierarchical tree topology architecture in accordance with some embodiments.

FIG. 1B illustrates an exemplary logic view of an interposer within the chiplet-based hierarchical tree topology architecture in accordance with some embodiments. The logic view illustrated in FIG. 1B corresponds to the interposer 110 in FIG. 1A. As shown, the interposer 150 in FIG. 1B includes a router (circle labeled with R) as the root of a tree, which has multiple chiplet-level switches (circles labeled with 0, 1, 2, 3) as the root's children nodes. Each of the chiplet-level switches is further connected to multiple NPEs (circles labeled with as children nodes.

Figure 2:
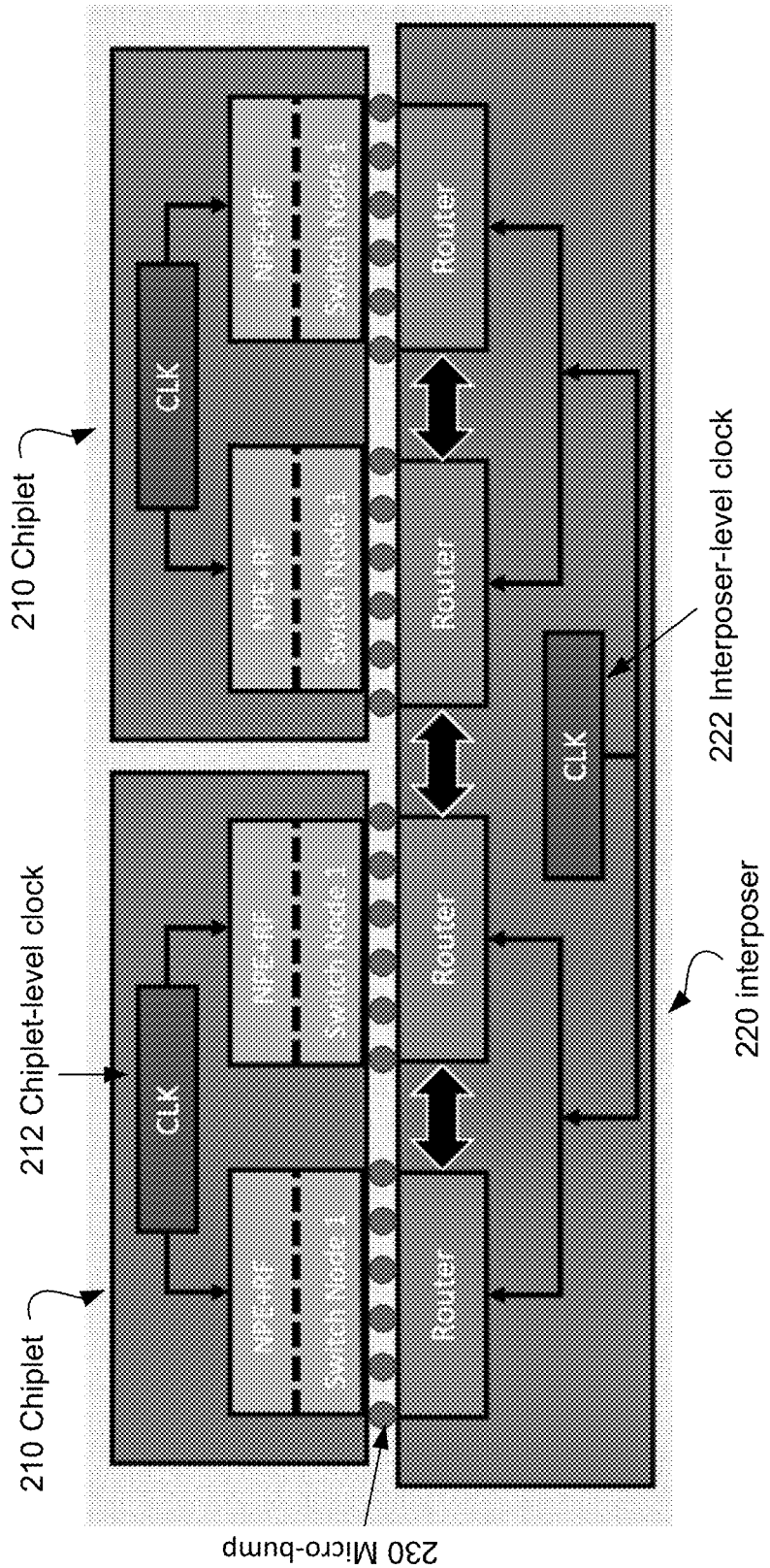
FIG. 2 illustrates an exemplary cross-section diagram of an interposer in the chiplet-based hierarchical tree topology architecture in accordance with some embodiments.

FIG. 2 illustrates an exemplary cross-section diagram of an interposer in the chiplet-based hierarchical tree topology architecture in accordance with some embodiments. The interposer 220 in FIG. 2 is for illustrative purposes, and depending on the implementation, may include fewer, more, or alternative components.

In some embodiments, an interposer 220 may organize a plurality of chiplets 210 in a tree topology using a plurality of routers. Each of the routers may have a first set of interfaces for connecting to one or more of the plurality of chiplets 210, and a second set of interfaces for connecting to one or more other routers. One chiplet is connected to only one router, but one router may be connected to multiple chiplets. In some embodiments, each of the plurality of chiplets 210 may include an chiplet-level tree topology (more details in FIG. 3) with a root-level switch. Each chiplet is connected to the corresponding router by connecting its root-level switch to the router via the first set of interfaces. In some embodiments, the first set of interfaces may include micro-bump 230. The micro-bump 230 can have a smaller pitch (e.g., 40-55 um) in comparison to solder-bump in traditional PC board (PCB) packaging, and thus can provide a more dense placement of the chiplets 210 within the interposer 220 and a higher data transfer bandwidth.

In some embodiments, the interposer 220 may have an interposer-level clock 222 for coordinating the plurality of chiplets 210 within the interposer through a plurality of routers. For instance, the interposer-level clock 222 may send clock signals that oscillates between a high and a low state and is used like a metronome to control actions of the routers, which indirectly coordinate the actions of the chiplets 210 connected to the routers.

As shown in FIG. 2, Each chiplet 210 may include a chiplet-level clock 212 for coordinating the actions of the NPEs within the chiplet 210. In some embodiments, all chiplets 210 within the interposer 220 share a same chiplet-level clock 212, and all NPEs across the chiplets 210 may be on the same clock. In some embodiments, different chiplets 210 within the interposer 220 are individually configurable. A user may configure different clocks on the chiplets 210 so that the chiplets 210 can perform different functionalities. This is especially practical and meaningful for processing SNN models and applications. For example, this design enables implementing an SSN that fires different neurons on different temporal signals (e.g., clock signals).

In some embodiments, within each chiplet 210, one or more NPEs may be organized in a tree topology as well. Each NPE may be associated with one or more register files acting as a local memory. The NPEs 210 may be organized as a tree using NPE-level switches, as shown in FIG. 3.

Figure 3:
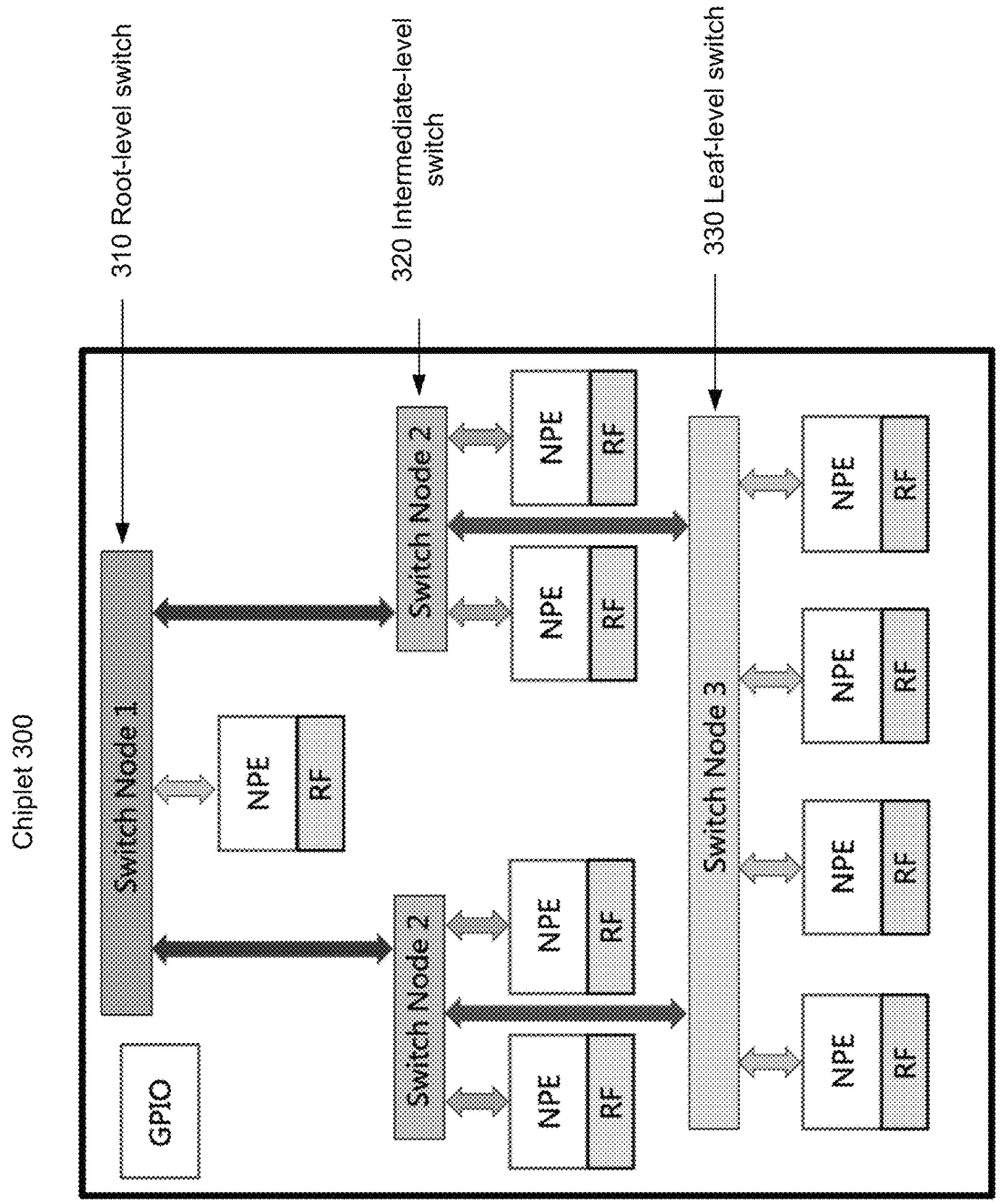
FIG. 3 illustrates an exemplary system diagram of a chiplet in the chiplet-based hierarchical tree topology architecture in accordance with some embodiments.

FIG. 3 illustrates an exemplary system diagram of a chiplet 300 in the chiplet-based hierarchical tree topology architecture in accordance with some embodiments. The chiplets illustrated in FIG. 1A-2 have only one level of NPEs, therefore do not show the tree-structure within the chiplet. The chiplet 300 in FIG. 3 illustrates a plurality of NPEs organized in a multi-level tree topology using hierarchical NPE-level switches. The diagram in FIG. 3 is for illustrative purposes only, and the chiplet 300 may have fewer, more, and alternative components and connections depending on the implementation.

In some embodiments, the chiplet 300 may include a root-level switch 310 at a root level (a highest level in the tree topology in the chiplet 300), multiple leaf-level switches 330 at a leaf level (a lowest level in the tree topology in the chiplet 300), and a plurality of intermediate-level switches 320 between the root-level and the leaf-level. In some embodiments, each of the plurality of intermediate-level switches 350 is connected to two or more lower-level switches (e.g., 330) and one higher-level switch (e.g., 310). Each of the NPE within the chiplet 300 is only connected to one switch.

In some embodiments, each NPE-level switch (310, 320, or 330) in the chiplet 300 may be connected another NPE-level switch through a first set of interfaces, and be connected to one or more NPEs along with corresponding register files (RF) through a second set of interfaces. In some embodiments, the connection interfaces (the first set of interfaces, the second set of interfaces, or both) within the chiplet 300 may adopt general-purpose input/output (GPIO), which is an uncommitted digital signal pin on an integrated circuit or electronic circuit board used as an input or output, or both. In some embodiments, NPEs under the same switch may be connected via a local BUS as a dedicate data communication channel, and NPEs under different switches may exchange data though a routing across two or more switches.

Figure 4:
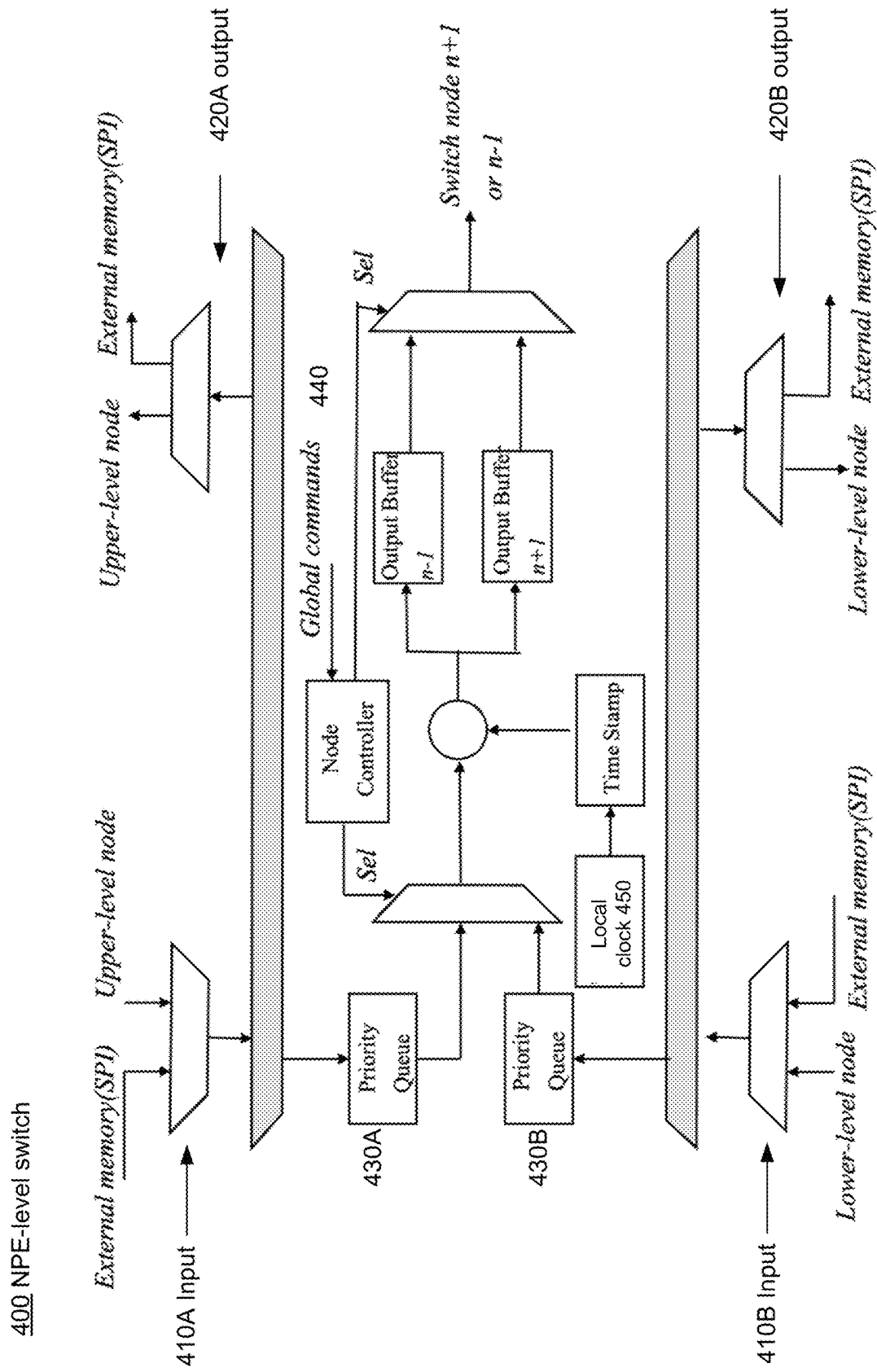
FIG. 4 illustrates an exemplary system diagram of an NPE-level switch with in a chiplet in a chiplet-based hierarchical tree topology architecture in accordance with some embodiments.

FIG. 4 illustrates an exemplary system diagram of a NPE-level switch 400 in the chiplet-based hierarchical tree topology architecture in accordance with some embodiments. The NPE-level switch 400 may refer to any of the root-level switch 310, the intermediate-level switches 320, or the leaf-level switches 330 in FIG. 3. The diagram in FIG. 4 is for illustrative purposes only, and the NPE-level 400 may have fewer, more, and alternative components and connections depending on the implementation.

In some embodiments, the NPE-level switch 400 may be used for data exchange between NPEs within the same chiplet or across different chiplets or even interposers. The NPEs under the same switch 400 may be locally connected with a bus providing dedicated bandwidth.

As shown in FIG. 4, the NPE-level switch 400 may include two or more input interfaces 410A and 410B, respectively corresponding to a higher-level switch node and a lower-level switch node. Here, the "higher-level" and "lower-level" refer to the level within the tree topology within a chiplet. For example, the input 410A may include a MUX to receive a request from an external memory or the higher-level switch node. The request may include data, instruction, or both, for forwarding to another switch.

In some embodiments, the input interfaces 410A and 410B may store the received requests into different priority queues 430A and 430B, respectively. These priority queues 430A and 430B may temporarily store the received to-be-forwarded requests. In some embodiments, the NPE-level switch 400 may also include a node controller for receiving global commands 440 from upper level schedulers. These global commands 440 may specify a forwarding sequence of the requests stored in the priority queues 430A and 430B. For instance, both priority queues 430A and 430B may send their respective first requests to a MUX, which is controlled by the node controller to select one of the first requests based on the global commands 440. The selected request may be the next one to be forwarded.

In some embodiments, the NPE-level switch 400 may include a local clock 450 (e.g., a chiplet-level clock) for controlling the forwarding action based on time signals. For example, the clock 450 may specify that each request is forwarded every 1 micro-second. The clock 450 may be an individually configurable clock for configuring the request forwarding pace of the NPE-level switch 400. This configurable clock allows the NPE-level switch 400 (and its underlying NPEs and RFs) to implement a group of neurons in a Neuromorphic chip or system that may be fired based on clock signals.

In some embodiments, the selected request may be fed into a corresponding output buffer within the NPE-level switch 400 before being forwarded out to the target switch node. The NPE-level switch 400 may include multiple output buffers respectively corresponding to the input interfaces (e.g., 410A and 410B). These output buffers may act as staging places waiting on the node controller to determine the target switch node. Once the node controller determines the target switch node, e.g., either a higher-level switch node (denoted as node n+1) or a lower-level switch node (denoted as node n−1), the corresponding output buffer may be selected and the first request therein may be forwarded to the corresponding output interface (e.g., 420A or 420B).

Figure 5:
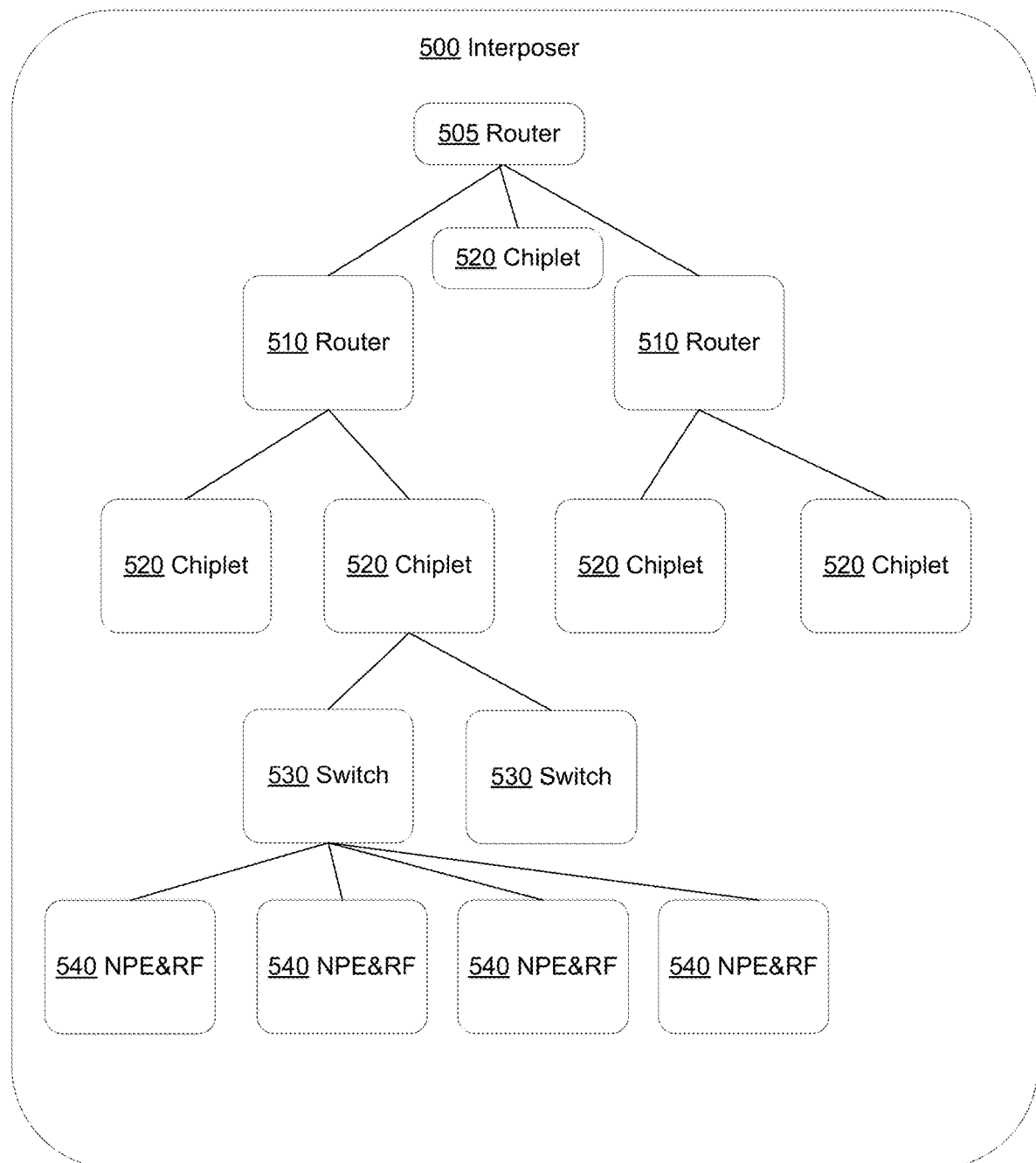
FIG. 5 illustrates an exemplary block diagram of an interposer in the chiplet-based hierarchical tree topology architecture in accordance with some embodiments.

FIG. 5 illustrates an exemplary block diagram of an interposer 500 in the chiplet-based hierarchical tree topology architecture in accordance with some embodiments. The interposer 500 may be deemed as an electrical carrier that has its internal circuitries organized in a tree topology. As shown in FIG. 5, the interposer 500 may include one or more routers 505 and 510 that organize a plurality of chiplets 520 in a tree topology, and each chiplet 520 may include one or more switches 530 that organize a plurality of NPEs and RFs 540 in a tree topology. The diagram in FIG. 5 is for illustrative purposes only, and the interposer 500 may have fewer, more, and alternative components and connections depending on the implementation.

In some embodiments, a plurality of the interposers 500 may be used components for implementing the next generation processing units such as GPUs or NPUs, as well as the next generation data centers for handling SNN models and applications. In some embodiments, each chiplet 530 within the interposer may include 100-200 NPEs to balance the size of the die during manufacturing and the performance Each NPE may implement about 200 millions of neurons. It means, each chiplet 530 may correspond to 2-4 billion of neurons. The number of chiplets 530 within one interposer 500 may be determined based on the size of each chiplet 530. Based the state of art of the manufacturing technology, the size of the interposer may be limited by the wafer reticle size limit, which defines the amount of chip surface area that can be exposed using a single mask.

The tree topology of the interposer 500 effectively provides a flexible and hierarchical bandwidth configurations for the NPEs (where the neurons reside). For example, the NPEs 540 under the same switch 530 are connected with local bus, i.e., a dedicated channel only serving these NPEs 540 to provide the optimal bandwidth; the NPEs 540 across different switches 530 but still within the same chiplet 520 may exchange data through a few number of dedicated switches 530 (dedicated only to the corresponding NPEs 540); while the NPEs 540 across different chiplets 520 may exchange data through a few number of dedicated switches 530 and routers 510 (dedicated to the corresponding chiplets 520). It may be noted that the more localized the nodes (NPEs 540, or chiplets 52) enjoy the denser and more dedicated the data exchange channels. This way, the interposer 500 structure favors local data exchange, which is compatible with the data flow pattern in SNNs. This design has technical benefits over existing Bus and Mesh based architectures. For instance, a bus-based SoC may have its nodes share the same bus, and the nodes would compete with each other for the fixed bandwidth. The competition among the nodes limits the scalability and the bandwidth of the SoC. As another example, a mesh-based SoC may require every two nodes to be connected for the ideal bandwidth (e.g., every two nodes have a direct connection), which may not scale well because the complexity of wiring grows exponentially when the number of neurons grows.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A chiplet-based neuromorphic system, comprising:
    a plurality of neuron processing entities (NPEs);
    a plurality of chiplets each comprising a plurality of switches and a group of NPEs from the plurality of NPEs, wherein:
        each of the plurality of switches within each chiplet comprises a first set of interfaces for connecting to one or more of the group of NPEs, and a second set of interfaces for connecting to one or more other switches of the plurality of switches,
        the plurality of switches within the each chiplet are organized in a tree topology through the corresponding second sets of interfaces, and
        each of the plurality of NPE is connected to only one of the plurality of switches through the first set of interfaces of the one switch; and
    a plurality of interposers each comprising a plurality of routers and a group of chiplets from the plurality of chiplets, wherein:
        each of the plurality of routers within each interposer comprises a third set of interfaces for connecting to one or more of the group of chiplets within the each interposer through one or more switches in the one or more chiplets, and a fourth set of interfaces for connecting to one or more other routers of the plurality of routers,
        the plurality of routers within the each interposer are organized in a tree topology through the corresponding fourth set of interfaces, and
        each of the plurality of chiplets is connected to only one of the plurality of routers through the third set of interfaces of the one router.

2. The system of claim 1, wherein each of the plurality of NPEs comprises register files as a local memory.

3. The system of claim 1, wherein the third set of interfaces for connecting the one or more chiplets to the router comprises one or more micro-bumps.

4. The system of claim 1, further comprising:
    a plurality of rack-level switches each connecting to a group of interposers from the plurality of interposers, wherein the plurality of rack-level switches are organized in a tree topology.

5. The system of claim 1, wherein each of the plurality of chiplets comprises a configurable chiplet-level clock to coordinate the group of NPEs within the each chiplet.

6. The system of claim 5, wherein the chiplet-level clock of one chiplet is independent from the chiplet-level clock of another chiplet.

7. The system of claim 5, wherein each of the plurality of interposers comprises a configurable interposer-level clock to coordinate the group of chiplets within the each interposer, wherein the interposer-level clock is independent from the chiplet-level clock.

8. The system of claim 1, wherein the plurality of switches within each chiplet that are organized in the tree topology comprise:
    a root-level switch at a root level, wherein the root level is a highest level in the tree topology;
    multiple leaf-level switches at a leaf level, wherein the leaf level is a lowest level in the tree topology; and
    a plurality of intermediate-level switches between the root-level and the leaf-level, wherein each of the plurality of intermediate-level switches is connected to two or more lower-level switches and one higher-level switch.

9. The system of claim 8, wherein one of the plurality of intermediate-level switches comprises:
    a first input interface configured to receive one or more first requests from the higher-level switch;
    a first priority queue configured to store the received one or more first requests;
    a second input interface configured to receive one or more second requests from one of the two or more lower-level switches;
    a second priority queue configured to store the received one or more second requests; and
    a third input interface configured to receive one or more global commands that control a forwarding sequence of the one or more first requests stored in the first priority queue and one or more second requests stored in the second priority queue.

10. The system of claim 9, wherein the one or more first requests received from the higher-level switch comprise data received from the one or more of the group of NPEs connected to the higher-level switch.

11. The system of claim 1, wherein the group of NPEs within the each chiplet are connected with a local bus for local data communication without going through the plurality of switches in the chiplet.

12. A tree-topology-based chiplet, comprising:
a plurality of neuron processing entities (NPEs); and
a plurality of switches each connecting to one or more of the plurality of NPEs;
wherein each of the plurality of NPEs is connected to only one of the plurality of switches, and the plurality of switches are organized in a tree topology that comprises:
   a root-level switch at a root level, wherein the root level is a highest level in the tree topology;
   multiple leaf-level switches at a leaf level, wherein the leaf level is a lowest level in the tree topology; and
   a plurality of intermediate-level switches between the root-level and the leaf-level, wherein each of the plurality of intermediate-level switches is connected to two or more lower-level switches and one higher-level switch.

13. The chiplet of claim 12, further comprising a configurable chiplet-level clock to coordinate the plurality of NPEs.

14. The chiplet of claim 13, wherein the chiplet-level clock of the chiplet is independent from the chiplet-level clock of another chiplet.

15. The chiplet of claim 12, wherein one of the plurality of intermediate-level switches comprises:
a first input interface configured to receive one or more first requests from the higher-level switch;
a first priority queue configured to store the received one or more first requests;
a second input interface configured to receive one or more second requests from one of the two or more lower-level switches;
a second priority queue configured to store the received one or more second requests; and
a third input interface configured to receive one or more global commands that control a forwarding sequence of the one or more first requests stored in the first priority queue and one or more second requests stored in the second priority queue.

16. The chiplet of claim 15, wherein the one or more first requests received from the higher-level switch comprise data received from the one or more of the group of NPEs connected to the higher-level switch.

17. A chiplet-based tree-topology neuromorphic chip, comprising:
a plurality of neuron processing entities (NPEs); and
a plurality of chiplets each comprising a plurality of switches and a group of NPEs from the plurality of NPEs,
wherein:
   each of the plurality of switches within each chiplet connects to one or more of the group of NPEs within the each chiplet,
   each of the plurality of NPEs is connected to only one of the plurality of switches,
   the plurality of switches within the each chiplet are organized in a tree topology, and
   the plurality of chiplets are packaged into an interposer using one or more micro-bumps.

18. The neuromorphic chip of claim 17, wherein each of the plurality of chiplets comprises a configurable chiplet-level clock to coordinate the group of NPEs within the each chiplet.

19. The neuromorphic chip of claim 18, wherein the chiplet-level clock of one chiplet is independent from the chiplet-level clock of another chiplet.

20. The neuromorphic chip of claim 17, wherein the plurality of switches within each chiplet that are organized in the tree topology comprise:
a root-level switch at a root level, wherein the root level is a highest level in the tree topology;
multiple leaf-level switches at a leaf level, wherein the leaf level is a lowest level in the tree topology; and
a plurality of intermediate-level switches between the root-level and the leaf-level, wherein each of the plurality of intermediate-level switches is connected to two or more lower-level switches and one higher-level switch.

* * * * *